United States Patent Office.

HENRY M. JOHNSTON, OF NEW YORK, N. Y.

Letters Patent No. 105,576, dated July 19, 1870; antedated July 8, 1870.

IMPROVEMENT IN PROTECTING AND BEAUTIFYING CRYSTALLIZED METALLIC SURFACES.

The Schedule referred to in these Letters Patent and making part of the same.

*To all whom it may concern:*

Be it known that I, HENRY M. JOHNSTON, of the city, county, and State of New York, have invented a new and useful Improvement in Protecting and Beautifying Crystallized Metallic Surfaces; and I do hereby declare that the following is a full, clear, and exact description thereof.

It is well known that tin, when superficially subjected to the action of dilute acid solutions, (generally some modification of the nitro-hydrochloric,) so as to remove the surface film, and then being well washed and dried, will exhibit, by reflected light, the crystalline texture present in all pure tin.

By the use of artificial means the crystalline structure of the tin may be modified previous to its treatment with the acid solutions, and thereby the most beautiful and varied results may be obtained. Tinplate and foil so treated has been in use for various kinds of ornamentation, and known under the name of *moiré métallique.*

In order to preserve the brilliancy of these crystallized surfaces, the method of coating them with transparent or colored varnish or gelatine has been in use, but this method has been but partially successful, as the varnish soon becomes dull and defaced by use, and does not wholly protect the crystallized surface of the tin from atmospheric action.

The object of my invention is to protect and beautify crystallized surfaces of tin, thereby fitting them for various purposes of decoration or ornamentation, such as table-tops, toilet and other fancy boxes, panels for furniture and doors, summer-pieces for grates, ornamental letters, and a great variety of useful and ornamental purposes.

To enable others skilled in the art to make and use my invention, I will proceed to describe its mode of construction and application to use.

I take a piece of glass or mica, and, having cleaned its surface, I pour upon it (using care not to produce air-bubbles) some Canada balsam, Venice turpentine, or other suitable transparent adhesive substance. I then place the crystallized surface of the tin to be protected in contact with the adhesive substance, and then make use of a flat dull-edged tool, and slide the edge of it, with slight pressure, over the back of the tin, thereby causing the adhesive substance to flow over the surface of the glass and crystallized tin in the direction of the edges, to the exclusion of the air, and, after having thus caused the adhesive substance to flow over the entire surface, and leaving only enough to seal the crystallized tin surface to the glass or mica, I then clean off the excess and allow the edges to dry, when the crystallized tin surface will be found to be hermetically and permanently sealed to the glass or mica. In precisely the same manner, tin having both of its surfaces crystallized may be sealed between two pieces of glass or mica. This method is desirable when panels are to be made for doors, or where both sides are exposed to view.

It will be readily understood that any suitable device may be employed to cause the adhesive substance to flow and seal the crystallized surface of the tin to the glass or mica, without departing from the nature of my invention.

In cases where the crystallized tin is very thin, and only one side is to be sealed to the glass or mica, I then prefer coating the back of the tin with paper, so as to protect it from the friction used in sealing. The tin may be readily coated with the paper by spreading on it (with a brush) a thin varnish of shellac, dissolved in alcohol, and, when the alcohol has partly evaporated, I then attach the paper to the varnished surface of tin by friction with the hand.

For most purposes it is desirable to view the crystallized surface of the tin through a colored medium, in which case I varnish the surface of either the glass, mica, or crystallized tin with a transparent varnish of the desired color, and, after it has dried, I then seal the crystallized surface of the tin to the colored surface of the glass or mica, as before.

By varnishing the surface of the glass or mica with a varnish of one color, and the surface of the crystallized tin with that of another color, and then sealing the two varnished or colored surfaces together, a variety of tints or colors can be obtained that it would be impossible to get by admixture of colors to the varnish.

The surfaces of the crystallized tin, glass, or mica can be ornamented with gilding, or in any other desirable way, before sealing them together.

Very beautiful mosaics can be made by cutting the sections of a design from crystallized tin that has been varnished with various harmonious colors, and then sealing each section to the glass or mica separately.

This process of sealing crystallized surfaces of tin to glass or mica imparts to the surface of the tin a depth and brilliancy that has not been equalled by any other means.

Having thus described my invention,

What I claim as new, and desire to secure by Letters Patent, is—

1. The new manufacture, hermetically sealed surfaces of crystallized tin, whether plain, colored, or ornamented, to or between plain, colored or ornamented glass or mica, substantially as described.

2. Hermetically sealing surfaces of crystallized tin, whether plain, colored, or ornamented, to or between plain, colored, or ornamented glass or mica, in the manner described, and for the purpose substantially as set forth.

HENRY M. JOHNSTON.

Witnesses:
O. S. FOLLETT,
DAVID EARLE.